United States Patent [19]

Harada et al.

[11] 4,453,962

[45] Jun. 12, 1984

[54] METHOD OF MANUFACTURING A FLEXIBLE OPTICAL FIBER BUNDLE

[75] Inventors: Yuho Harada; Tsutomu Maruyama; Yoshiyuki Kumakura; Shigeo Kuwayama, all of Ohmiya, Japan

[73] Assignee: Fuji Photo Optical Co., Ltd., Saitema, Japan

[21] Appl. No.: 386,441

[22] Filed: Jun. 8, 1982

[30] Foreign Application Priority Data

Jun. 8, 1981 [JP] Japan .................. 56-87941

[51] Int. Cl.³ .................. C03B 37/025; C03C 23/00
[52] U.S. Cl. .................. 65/3.15; 65/3.13; 65/4.2; 65/31; 156/155
[58] Field of Search .................. 65/3.13, 3.15, 3.2, 65/4.2, 31; 156/155

[56] References Cited

U.S. PATENT DOCUMENTS

| | | | |
|---|---|---|---|
| 3,188,188 | 6/1965 | Norton | 65/4.2 X |
| 3,383,192 | 5/1968 | Siegmund | 156/155 X |
| 3,830,667 | 8/1974 | Carpenter | 65/4.2 X |
| 3,981,706 | 9/1976 | Strack | 65/3.15 |
| 4,175,940 | 11/1979 | Siegmund | 65/4.2 |
| 4,389,089 | 6/1983 | Strack | 65/3.15 X |

OTHER PUBLICATIONS

Tachibana et al., ". . . Fiberscopes Using Leached Fiber Image Bundles," J. Non-Crystalline Solids, May-Jun. 1980, pp. 803-805.

*Primary Examiner*—Richard V. Fisher
*Attorney, Agent, or Firm*—Eyre, Mann, Lucas & Just

[57] ABSTRACT

A number of three-layer optical fibers each having a core a cladding and an overcoating layer of acid-soluble glass material are bonded together by means of an adhesive which can be removed by applying heat. The bonded optical fibers are heated and stretched to obtain a solid optical fiber bundle. The solid optical fiber bundle is brought into contact with an acid to elute (leach away) the overcoating layer of the acid-soluble glass material.

2 Claims, 7 Drawing Figures

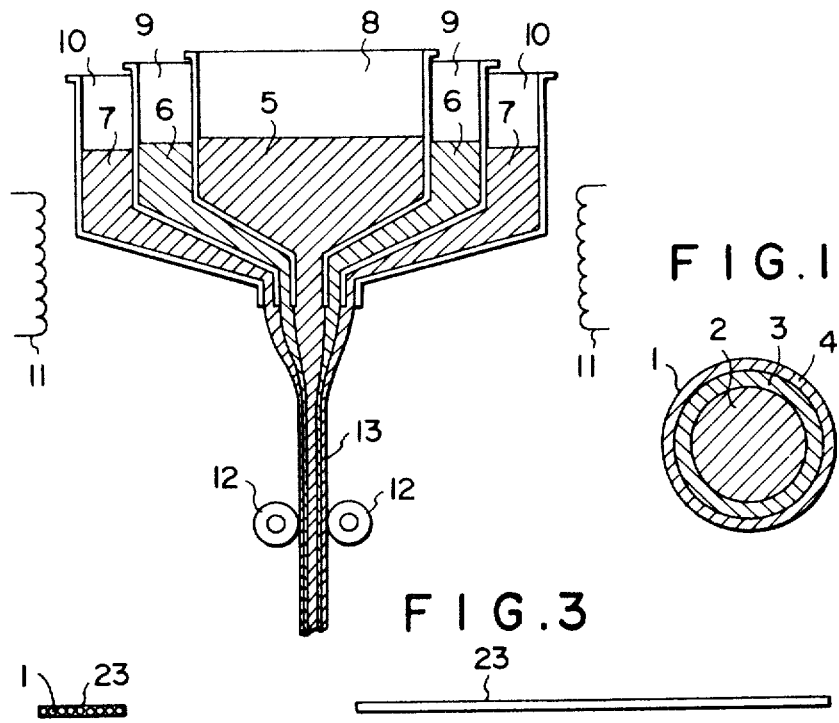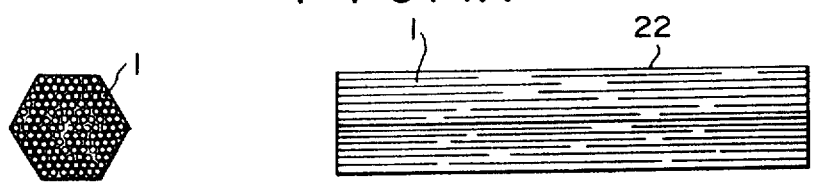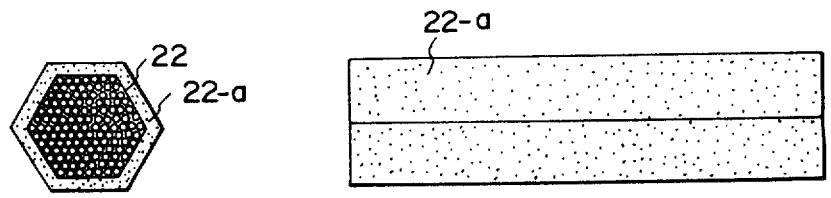

METHOD OF MANUFACTURING A FLEXIBLE OPTICAL FIBER BUNDLE

BACKGROUND OF THE INVENTION

1. Field of the Invention

This invention relates to a method of manufacturing a flexible optical fiber bundle, and more particularly to a method of manufacturing an optical fiber bundle comprising a plurality of optical fibers which are connected together at the ends thereof and are disconnected from each other at the intermediate portion between the connected ends to give flexibility to the optical fiber bundle at the intermediate portion thereof.

2. Description of the Prior Art

When an optical fiber bundle is used for guiding an image, the arrangement of the end faces of the individual optical fibers at one end of the bundle must correspond to that at the other end thereof. When the optical fiber bundle for the image guide is used in an endoscope, for example, the bundle should have a flexible intermediate portion with the optical fibers constituting the bundle connected together at the ends thereof. In such an optical fiber bundle, the intermediate portions of the individual optical fibers are disconnected from each other to give flexibility to the intermediate portion of the bundle. There have been proposed various methods of manufacturing an optical fiber bundle in which the individual optical fibers are connected together at the ends thereof and disconnected from each other at the portion between the ends.

In one method, core glass material having a high refractive index is introduced into the inner crucible of a double crucible and cladding glass material having a low refractive index is introduced into the outer crucible of the same. The double crucible is heated up to an appropriate temperature and the melt glass is drawn through orifices in the bottom of the crucible from the inner and outer crucibles to obtain an optical fiber consisting of a core and a cladding therearound. The optical fiber thus obtained is rolled up to form a plurality of loops contiguously arranged in a single array in the axial direction thereof. The loops are bonded together by means of adhesive at a part thereof. Subsequently, a second array of the same kind is stacked on the first array and loops of the second array are bonded together at the same part of the loops and to the bonded part of the first array. These steps are repeated to obtain a looped optical fiber bundle having a desired thickness. Then the looped optical fiber bundle is severed at the center of the bonded part along a line perpendicular to the longitudinal direction of the optical fibers, and the cut surfaces are polished.

In this method, a desired final thickness, e.g., 20μ of the optical fibers is obtained in one heating operation, and therefore, very thin optical fibers must be handled in the subsequent step, i.e., the step of arranging the optical fibers. This step requires skill and there is a high possibility of severing the optical fiber during the step, which results in a low yield and an increased manufacturing cost.

Another method involves use of an acid step. In this method, core glass material having a high refractive index is introduced into the innermost crucible of a triple crucible, cladding glass material having a low refractive index and a high resistance to acids is introduced into the middle crucible of the same, and acid-soluble glass material having an expansion coefficient and a viscosity similar to those of the core glass and the cladding glass is introduced into the outermost crucible of the same. The triple crucible is heated up to an appropriate temperature and the melt glass is drawn through orifices in the bottom of the triple crucible from three crucibles thereof, thereby obtaining a three-layer optical fiber comprising an innermost layer of the core glass an intermediate layer of the cladding glass and an outermost layer of the acid-soluble glass and having a diameter of about 200μ. The three-layer optical fiber is cut into pieces of an appropriate length, e.g., 400 mm. A number (e.g., 10,000) of the pieces are orderly arranged in a jacketing tube of acid-soluble glass, and are fused together. The assembly is then further heated and stretched to reduce the diameter of each optical fiber piece to about 1/15. The solid optical fiber bundle thus obtained is provided with acid resistant coatings at the end portions thereof, and then brought into contact with an acid (e.g., nitric acid) to elute the acid-soluble glass from the intermediate portion thereof. In this method, the step of arranging the optical fibers can be more easily carried out with a less possibility of severing the fibers than with the previously described method, since the thickness of the fibers handled in the step is larger. Further, since the fibers are fused together subsequently, there is little possibility of their being severed after the step of arranging them. Accordingly, with this method, the yield of the products can be increased and the manufacturing cost can be reduced compared with the previously described method.

However, this method is disadvantageous in that a jacketing tube of acid-soluble glass, which is poor in workability compared with soda-lime glass, must be used. Because of the poor workability of the acid-soluble glass, fluctuation in the internal diameter of the jacketing tube in its longitudinal direction is very large. When such a jacketing tube is used, the orientation of the individual optical fibers is adversely affected so that the image transmitting characteristics of the obtained optical fiber bundle is significantly lowered.

In order to overcome the above problem, there has been proposed another method intended to improve on the method described immediately above (Unexamined Japanese Patent Publication No. 52(1977)-42737 dated Apr. 2, 1977). In the improved method, the jacketing tube of the acid-soluble glass containing there in a number of the three-layer optical fiber pieces is inserted into an over-jacketing glass tube which is larger than the jacketing tube both in diameter and length. The over-jacketing glass tube is connected to an evacuating means for internal evacuation thereof. Then the over-jacketing glass tube is heated to fuse the three-layer optical fiber pieces together and subsequently removed therefrom. In this method, the over-jacketing glass tube may be of ordinary soda-lime glass and thus can be formed to a sufficient dimensional accuracy so that the optical fiber pieces can be properly oriented. However, the over-jacketing glass tube must be mechanically removed, which significantly adds to the number of the manufacturing steps.

SUMMARY OF THE INVENTION

In view of the foregoing observations and description, the primary object of the present invention is to provide an improved method of manufacturing a flexible optical fiber bundle in which a flexible optical fiber bundle of excellent image transmitting characteristics having the optical fibers therein optimally oriented can be effectively produced.

The method of the present invention comprises the steps of forming a number of three-layer optical fibers each having an innermost layer of core glass having a high refractive index, an intermediate layer of cladding glass having a low refractive index and a high resistance to acids, and an outermost layer of acid-soluble glass; at least partly bonding together the number of three-layer optical fibers by means of adhesive which can be removed by applying heat; heating and stretching the bonded optical fibers to obtain a solid optical fiber bundle; and processing the obtained solid optical fiber bundle with an acid to elute the layer of the acid-soluble glass.

In the optical fiber bundle produced in accordance with the method of the present invention, the effective area directly available for transmitting an image is substantially increased compared with one produced in accordance with the prior art, since no jacketing tube is used.

BRIEF DESCRIPTION OF THE DRAWINGS

FIG. 1 is a cross sectional view of a three-layer optical fiber,

FIG. 2 is a schematic view for illustrating the method of forming the three-layer optical fiber shown in FIG. 1, FIG. 3 shows end and side views of a strip-like optical fiber bundle obtained by arranging a number of the three-layer optical fibers in a flat array, FIG. 4A shows end and side views of a rod-like optical fiber bundle obtained by stacking a number of the strip-like optical fiber bundles shown in FIG. 3, FIG. 4B shows end and side views of a rod-like optical fiber bundle obtained by providing the rod-like optical fiber bundle of FIG. 4A with a layer of acid-soluble glass material on the outer surface thereof.

DETAILED DESCRIPTION OF THE INVENTION

Figure 5:
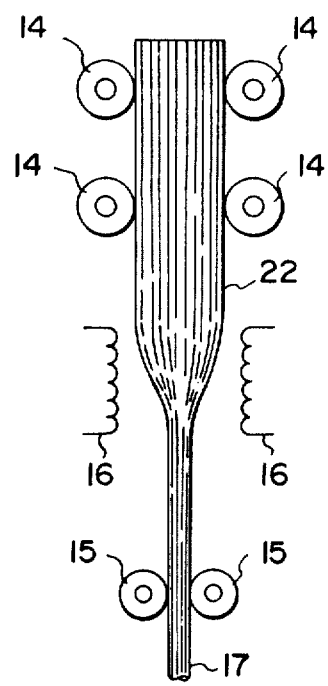
FIG. 5 is a schematic view for illustrating a step for stretching the rod-like optical fiber bundle to obtain a solid optical fiber bundle.

Now the method of the present invention will be described in more detail referring to the drawings.

First referring to FIG. 2, core glass material 5 having a high refractive index is introduced into the innermost crucible 8 of a triple crucible, cladding glass material 6 having a low refractive index is introduced into the intermediate crucible 9, and acid-soluble glass material 7 is introduced into the outermost crucible 10. As the core glass material 5, glass material having the following composition and characteristics can be used, for example.

Composition of the core glass material in weight percent: $SiO_2$ 45.0%, $K_2O$ 11.0%, $PbO$ 24.0%, $BaO$ 12.0%, $ZnO$ 5.0%, $Al_2O_3$ 3.0%, $AS_2O_3$ 0.7%.

Characteristics: refractive index (nd) 1.59062, transition point 528° C., softening point 583° C., thermal expansion coefficient $99 \times 10^{-7}$ cm/cm.°C.

Glass material having the following composition and characteristics can be used as the cladding glass material 6, for example.

Composition of the cladding glass material in weight percent: $SiO_2$ 64.0%, $Na_2O$ 16.0%, $PbO$ 12.0%, $ZnO$ 5.0%, $Al_2O_3$ 3.0%, $AS_2O_3$ 0.7%.

Characteristics: refractive index (nd) 1.52852, transition point 486° C., softening point 533° C., thermal expansion coefficient $92 \times 10^{-7}$ cm/cm.°C.

For example, glass material having the following composition and characteristics can be used as the acid-soluble glass material 7 in the present invention.

Composition of the acid-soluble glass material in weight percent: $SiO_2$ 19.5%, $B_2O_3$ 36.5%, $Na_2O$ 11.0%, $BaO$ 26.0%, $ZnO$ 7.0%, $AS_2O_3$ 0.3%.

Characteristics: refractive index 1.58090, transition point 540° C., softening point 574° C., thermal expansion coefficient $92 \times 10^{-7}$ cm/cm.°C.

The triple crucible containing therein the core glass material 5, the cladding glass material 6 and the acid-soluble glass material 7 is heated in an electric furnace 11 and then a three-layer optical fiber 1 as shown in FIG. 2 is drawn out from the triple crucible by means of a pair of rollers 12. FIG. 2 is a cross-sectional view of the three-layer optical fiber thus obtained. The three-layer optical fiber 1 has an external diameter of about 200μ wherein the thicknesses of the acid-soluble glass 4 and the cladding glass 3 are about 5μ and about 20μ, respectively, and the diameter of the core glass 2 is about 150μ. The triple layer optical fiber 1 is cut into pieces about 400 mm in length, and the pieces are arranged contiguously in a flat array. Then the pieces of the optical fiber are bonded together by means of adhesive applied thereto partially or over the entire length thereof. The adhesive should be of a type which can be removed by applying heat, e.g., nitrocellulose, acetyl cellulose, ethyl cellulose, polyvinyl butyral, or polyvinyl acetate. A strip-like optical fiber bundle 23 is thus formed as shown in FIG. 3. A plurality of such strip-like optical fiber bundles 23 thus obtained are stacked and bonded together by means of said adhesive, thereby forming a rod-like optical fiber bundle 22 as shown in FIG. 4A. The rod-like optical fiber bundle 22 is heated or heated and pressed in order to remove the adhesive and to fuse together the individual optical fiber pieces. Thereafter, the fused rod-like optical fiber bundle 22 is further heated and stretched by means of an apparatus like that shown in FIG. 5.

In the apparatus shown in FIG. 5, the fused rod-like optical fiber bundle 22 is gradually fed downward by means of a pair of rollers 14 while being heated to about 700° C. by an electric furnace 16 to be softened and is stretched downward by a pair of rollers 15. The degree of stretching is such that the solid optical fiber bundle 17 thus obtained has an external diameter of about 1.5 mm, which is about one fifteenth of that of the fused rod-like optical fiber bundle 22. In the solid optical fiber bundle 17, the diameter of the individual optical fiber is about 13μ.

The rod-like optical fiber bundle 22 may be directly fed to the apparatus of FIG. 5 without applying heat or heat and pressure so that the fusing, the removal of the adhesive and the stretching are simultaneously effected in the apparatus. If required, the fusing and the stretching may be carried out under vacuum to remove gas from between the individual optical fibers.

Figure 6:
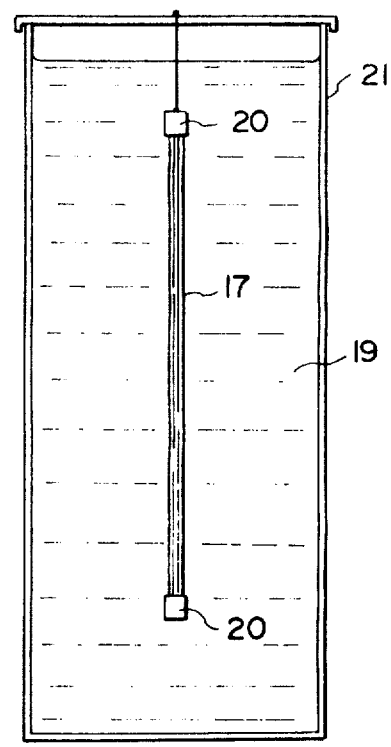
FIG. 6 is a schematic view for illustrating an acid step.

A coating of an acid-resistant resin 20 (FIG. 6) is applied to either end portion of the solid optical fiber bundle 17, and then the bundle 17 is dipped into a processing acid 19 in an eluting chamber 21 to elute the acid-soluble portion of the solid optical fiber bundle 17.

The spaces between the optical fibers in the peripheral portion of the solid optical fiber bundle 17 may be possibly too narrow to permit the processing acid 19 to infiltrate into the interior of the bundle 17. This problem can be solved by providing the rod-like optical fiber bundle 22 prior to stretching with a layer 22a of acid-soluble glass or a layer including a relatively large amount of acid-soluble glass on the outer surface of the bundle 22 as shown in FIG. 4B.

The layer 22a of acid-soluble glass can be provided by applying to the outer surface of the bundle 22 paste of a mixture of powdered acid-soluble glass and said adhesive which can be removed by applying heat. Alternatively, the layer 22a may be provided by inserting the bundle 22 into a mold and then casting the paste therearound. The paste is subsequently dried.

In order to increase the strength of the bundle 22 so that it can be readily handled during the subsequent steps, the powdered acid-soluble glass may be fused together by applying heat or heat and pressure subsequently to the drying.

Further, the layer 22a may be formed of fibers having thereon thick coatings of acid-soluble glass material or may be formed of fibers of acid-soluble glass material.

We claim:

1. A method of manufacturing a flexible optical fiber bundle comprising the steps of:
   (a) forming a number of three-layer optical fibers each including an innermost layer of core glass having a high refractive index, an intermediate layer of cladding glass having a low refractive index and a high resistance to acids, and an outermost layer of acid-soluble glass;
   (b) bonding together the number of three-layer optical fibers by means of adhesive which can be removed by applying heat;
   (c) treating the bonded optical fibers with heat or heat and pressure to fuse them together throughout their length and remove said adhesive;
   (d) heating said stretching the fused optical fibers to obtain a stretched optical fiber bundle; and
   (e) processing the stretched optical fiber bundle with an acid to leach away the layer of acid-soluble glass.

2. A method as defined in claim 1 in which a layer of acid-soluble glass is provided to cover the bonded optical fibers prior to the fusing.

* * * * *